(12) United States Patent
Parikh et al.

(10) Patent No.: US 11,988,121 B2
(45) Date of Patent: May 21, 2024

(54) ELECTRIC MOTOR INTEGRATED ROTATING CRANKCASE VENTILATION FILTER ASSEMBLIES

(71) Applicant: CUMMINS FILTRATION INC., Nashville, TN (US)

(72) Inventors: Chirag D. Parikh, Madison, WI (US); Ken Tofsland, Stoughton, WI (US)

(73) Assignee: CUMMINS FILTRATION INC., Nashville, TN (US)

(*) Notice: Subject to any disclaimer, the term of this patent is extended or adjusted under 35 U.S.C. 154(b) by 0 days.

(21) Appl. No.: 17/795,057

(22) PCT Filed: Dec. 7, 2020

(86) PCT No.: PCT/US2020/063533
§ 371 (c)(1),
(2) Date: Jul. 25, 2022

(87) PCT Pub. No.: WO2021/154392
PCT Pub. Date: Aug. 5, 2021

(65) Prior Publication Data
US 2023/0085051 A1 Mar. 16, 2023

Related U.S. Application Data

(60) Provisional application No. 62/966,688, filed on Jan. 28, 2020.

(51) Int. Cl.
*F01M 13/04* (2006.01)
*B01D 45/14* (2006.01)

(52) U.S. Cl.
CPC ............ *F01M 13/04* (2013.01); *B01D 45/14* (2013.01); *B01D 2279/35* (2013.01); *F01M 2013/0422* (2013.01); *F01M 2013/0438* (2013.01)

(58) Field of Classification Search
CPC .......... F01M 13/04; F01M 2013/0422; F01M 2013/0438; B01D 45/14; B01D 2279/35
See application file for complete search history.

(56) References Cited

U.S. PATENT DOCUMENTS 3,763,631 A 10/1973 Horn et al.
4,673,423 A 6/1987 Yumlu
(Continued)

FOREIGN PATENT DOCUMENTS

IN 2286/KOLNP/2013 4/2014
WO WO-2018/236921 12/2018

OTHER PUBLICATIONS

First Examination Report on IN Patent Application No. 202247036000 dated Sep. 23, 2022 (6 pages).
(Continued)

*Primary Examiner* — Kurt Philip Liethen
(74) *Attorney, Agent, or Firm* — Foley & Lardner LLP

(57) ABSTRACT

A rotating crankcase ventilation filter element comprises a motor comprising a stator and a rotor, and shaft. A first end of the shaft is coupled to the rotor and is configured to rotate in response to rotation of the rotor. A hub is disposed circumferentially around the shaft and coupled to the shaft such that the hub is rotationally locked with respect to the shaft. A filter media is disposed around the hub and secured thereto such that the filter media is rotationally locked with respect to the hub. The filter media is structured for axial flow of a gas through the filter media. A first end cap is disposed on a filter media first end, and a second end cap is disposed on a filter media second end of the filter media. The second end cap is coupled to the first end cap such that the filter media and the hub is secured therebetween.

22 Claims, 11 Drawing Sheets

(56) References Cited

U.S. PATENT DOCUMENTS

| | | | | |
|---|---|---|---|---|
| 5,250,094 A * | 10/1993 | Chung | ............... | F01N 13/017 |
| | | | | 55/DIG. 30 |
| 5,564,401 A * | 10/1996 | Dickson | ............. | F01M 13/023 |
| | | | | 123/573 |
| 6,152,120 A | 11/2000 | Julazadeh | | |
| 6,183,407 B1 * | 2/2001 | Hallgren | ............... | B04B 7/12 |
| | | | | 494/75 |
| 6,251,168 B1 | 6/2001 | Birmingham et al. | | |
| 6,517,612 B1 * | 2/2003 | Crouch | ............... | B01D 63/16 |
| | | | | 55/528 |
| 6,640,792 B2 | 11/2003 | Harvey et al. | | |
| 6,925,993 B1 | 8/2005 | Eliasson et al. | | |
| 7,235,177 B2 | 6/2007 | Herman et al. | | |
| 2002/0144937 A1 * | 10/2002 | Wilberscheid | ....... | B01D 29/21 |
| | | | | 210/85 |
| 2005/0120685 A1 | 6/2005 | Fischer et al. | | |
| 2005/0252845 A1 | 11/2005 | Kemmelmeyer | | |
| 2007/0249479 A1 * | 10/2007 | Eliasson | ............... | B01D 45/14 |
| | | | | 494/83 |
| 2008/0264251 A1 | 10/2008 | Szepessy | | |
| 2010/0180854 A1 * | 7/2010 | Baumann | ............... | B04B 5/005 |
| | | | | 123/196 R |
| 2013/0056407 A1 * | 3/2013 | Parikh | ............... | F02D 23/00 |
| | | | | 210/360.1 |
| 2014/0033668 A1 * | 2/2014 | Kleynen | ............... | B01D 29/21 |
| | | | | 55/502 |
| 2017/0001133 A1 * | 1/2017 | Ishida | ............... | B04B 5/12 |
| 2017/0120180 A1 | 5/2017 | Wood et al. | | |
| 2017/0296956 A1 | 10/2017 | Ishida et al. | | |
| 2018/0117512 A1 * | 5/2018 | Janakiraman | ....... | B01D 46/003 |
| 2018/0140986 A1 | 5/2018 | Parikh et al. | | |
| 2018/0169556 A1 | 6/2018 | Parikh et al. | | |
| 2018/0236387 A1 | 8/2018 | Parikh et al. | | |
| 2018/0243677 A1 | 8/2018 | Schwandt et al. | | |
| 2019/0299134 A1 * | 10/2019 | Herman | ............... | B01D 45/14 |

OTHER PUBLICATIONS

International Search Report and Written Opinion issued for PCT Application No. PCT/US2020/015362 dated Apr. 14, 2020, 9 pages.
International Search Report and Written Opinion issued for PCT Application No. PCT/US2020/063533 dated Mar. 17, 2021, 20 pages.

* cited by examiner

ELECTRIC MOTOR INTEGRATED ROTATING CRANKCASE VENTILATION FILTER ASSEMBLIES

CROSS-REFERENCE TO RELATED APPLICATIONS

The present application is the U.S. National Phase of PCT Application No. PCT/US2020/063533, filed Dec. 7, 2020, which claims priority to and the benefit of U.S. Provisional Application No. 62/966,688, filed Jan. 28, 2020, the entire disclosures of which are incorporated herein by reference.

TECHNICAL FIELD

The present application relates generally to rotating crankcase ventilation filter assemblies for use with internal combustion engine systems.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the aerosols contained in the blowby gases can harm the environment. Accordingly, the blowby gases are often routed out of the crankcase via a crankcase ventilation system. The crankcase ventilation system may pass the blowby gases through a coalescer (i.e., a coalescing filter element) to remove a majority of the aerosols and oils contained in the blowby gases. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating crankcase ventilation filter elements, for example, rotating coalescer elements that increase the filter efficiency of crankcase ventilation systems by rotating the coalescer element during filtering. In rotating coalescer elements, the contaminants (e.g., oil droplets suspended and transported by blowby gases) are separated at least in part by centrifugal separation techniques. Additionally, the rotation of the coalescer element can create a pumping effect, which reduces the pressure drop through the crankcase ventilation system.

In various rotating crankcase ventilation filters, multiple parts are generally used for enabling filter element service operation. For example, metallic bushings, inserts and other components may be used to transmit rotational torque from a motor to the filter element for rotating the filter element and withstand vibrations. Such additional components may have tighter tolerances and may have to be heat treated to prevent premature wear. Moreover, a motor shaft, bushings, inserts, and other parts used to transfer the torque to the filter element may have to be hardened to withstand vibration loads through the life of the crankcase ventilation systems.

SUMMARY

Embodiments described herein relate generally to rotating crankcase ventilation filter assemblies that include an axial flow filter media disposed around a hub coupled to a central shaft that is coupled to a motor. The filter media and the hub are secured between end caps that define an inner volume within which the filter media and the hub are secured.

In a set of embodiments, a rotating crankcase ventilation filter element comprises a motor comprising a stator and a rotor, and a shaft. A first end of the shaft is coupled to the rotor and configured to rotate in response to rotation of the rotor. A hub is disposed circumferentially around the shaft and coupled to the shaft such that the hub is rotationally locked with respect to the shaft. Filter media is disposed around the hub and secured to the hub such that the filter media is rotationally locked with respect to the hub. The filter media is structured for axial flow of a gas through the filter media. A first end cap is disposed on a filter media first end, and a second end cap is disposed on a filter media second end of the filter media. The second end cap is coupled to the first end cap such that the filter media and the hub is secured between the first end cap and the second end cap.

In another set of embodiments, a rotating crankcase ventilation filter assembly comprises a housing, comprising: a housing main body, and a base coupled to a first end of the housing main body The assembly also comprises a rotating crankcase ventilation filter element disposed at least partially within the housing. The rotating crankcase ventilation filter element comprises a motor comprising a stator and a rotor, and a shaft. A first end of the shaft is coupled to the rotor and configured to rotate in response to rotation of the rotor. A hub is disposed circumferentially around the shaft and coupled to the shaft such that the hub is rotationally locked with respect to the shaft. A filter media is disposed around the hub and secured to the hub such that the filter media is rotationally locked with respect to the hub, the filter media structured for axial flow of a gas through the filter media. A first end cap is disposed on a filter media first end. A second end cap is disposed on a filter media second end of the filter media, the second end cap coupled to the first end cap such that the filter media and the hub is secured between the first end cap and the second end cap.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of in this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
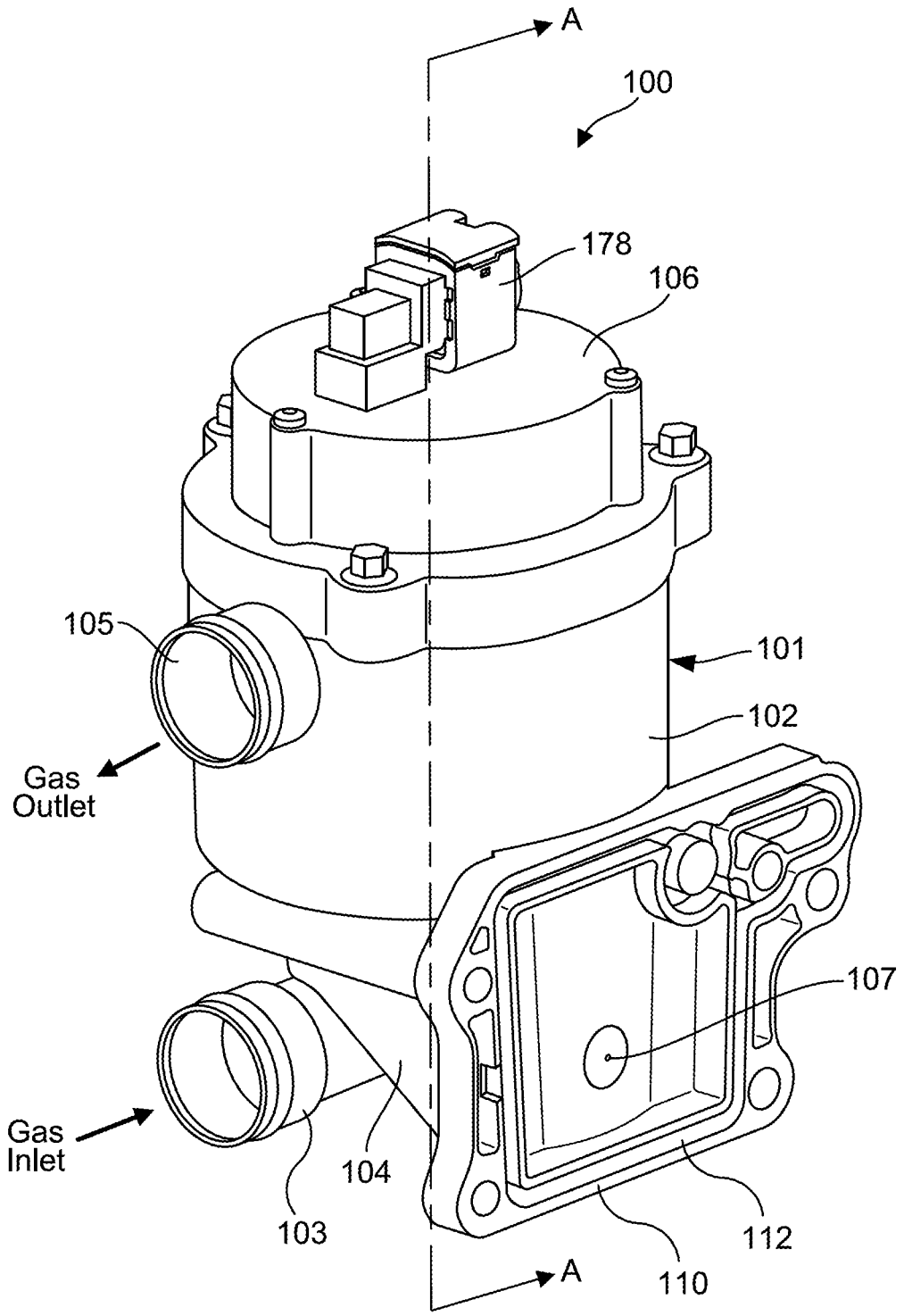
FIG. 1 is a top side perspective view of a rotating crankcase ventilation filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to rotating crankcase ventilation filter assemblies that include an axial flow filter media disposed around a hub coupled to a central shaft that is coupled to a motor. The filter media and the hub are secured between end caps that define an inner volume within which the filter media and the hub are secured.

Various embodiments of the rotating crankcase ventilation filter assemblies and filter elements described herein may provide one or more benefits including, for example: 1) providing axial flow through a rotating crankcase ventilation filter element; 2) providing direct coupling of a shaft of the rotating crankcase ventilation filter element to a rotor of a motor, thereby allowing removal of extra coupling components that reduces manufacturing complexity and maintenance cost; 3) allowing a larger number of axial flow filter media layers to be included in the filter element, thereby reducing wobbling and imbalance of the filter element and reducing vibrations; 4) allowing lubrication of a housing bearing included in the filter assembly by aerosols or oils that are separated from the blowby gas reducing maintenance cost.

Figure 2:
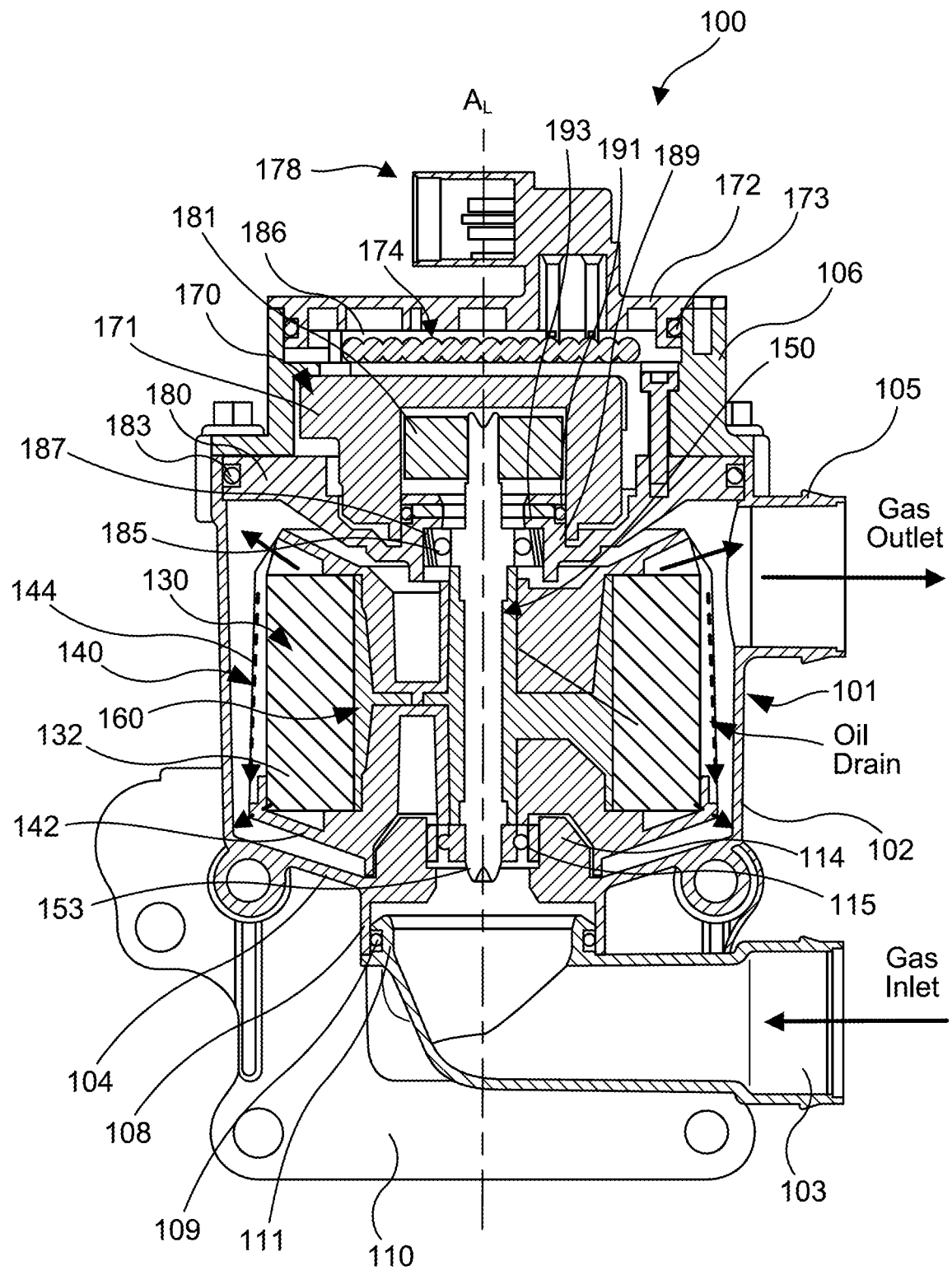
FIG. 2 is a side cross-section view of the filter assembly of FIG. 1 taken along the line A-A in FIG. 1.

Referring to FIGS. 1-2, a rotating crankcase ventilation filter assembly 100 (hereafter the "filter assembly 100") is shown, according to an embodiment. The filter assembly 100 generally processes blowby gases received from an internal combustion engine crankcase to remove aerosols, oils, and other particulate contained in the crankcase blowby gases.

The housing 101 includes a housing main body 102 and a base 104 coupled to a first end of the housing main body 102. In some embodiments, the base 104 may be monolithically formed with the housing main body 102. A mounting flange 110 extends from the base 104 and is configured to be coupled to a support structure, for example, to an engine crankcase sump (not shown). A groove 112 is defined on a mounting surface of the mounting flange 110 and within which a mounting flange sealing member (e.g., a gasket) may be disposed to fluidly seal the mounting flange 110 with the support structure. A drain 107 (FIG. 1) is defined through the mounting flange 110. Contaminants such as aerosols or oils that are separated from the blowby gases by the filter element 130 may be drained back to the crankcase sump via the drain 107.

As shown in FIG. 2, the base 104 includes a bearing mount flange 114 extending axially from an inner rim of the base 104 into the internal volume defined by the housing main body 102. The bearing mount flange 114 is configured to mount a housing bearing 115 therein. Thus, a separate bearing mount plate is not used. The housing bearing 115 may be pre-loaded with a biasing member (e.g., a wave washer). The housing bearing 115 may be lubricated with aerosols or oil included in the incoming blow by gases flowing into the housing 101 via an inlet 103. The positioning of the housing bearing 115 is configured to align an inflow of the blowby gases into the housing 101 such that the blowby gases flow axially into the filter element 130 and flow axially through the filter element 130.

The inlet 103 includes a conduit configured to deliver crankcase blowby gases to be filtered (e.g., from a crankcase of an internal combustion engine) into the housing main body 102. The base 104 also includes an inlet flange 108 extending axially from the inner rim of the base 104 away from the housing main body 102. The inlet flange 108 is configured to receive an inlet mounting end 111 of the inlet 103 and be coupled thereto. An inlet sealing member 109 (e.g., an O-ring or gasket) is disposed circumferentially between the inlet flange 108 and the inlet mounting end 111 to form a radial seal and prevent leakage of blowby gases or the coalesced contaminants. An outlet 105 is defined in a wall of the housing main body 102 and is configured to communicate filtered blowby gases out of the housing 101 and to the internal combustion engine (in a closed crankcase ventilation system) or to the ambient (e.g., in an open crankcase ventilation system).

A motor 170 is disposed within the housing main body 102. The motor 170 includes a cover 106 coupled to a second end of the housing main body 102 opposite the first end. The cover 106 may be removably coupled to the housing main body 102, for example via securing members (e.g., screws, bolts, nuts, etc.), threads, a snap-fit, or a friction-fit mechanism. In some embodiments, the cover 106 may include a cover plate 172 disposed radially within an inner rim defined by the cover 106. A cover plate sealing member 173 (e.g., an O-ring or gasket) may be disposed between a radially inner sidewall of the cover 106 and a radially outer periphery of the cover plate 172 to provide a radial seal between the cover plate 172 and the cover 106. A motor connector 178 (e.g., an electric connector such as a male or female connector) is disposed on the cover plate 172 and configured to be coupled to an electrical lead for providing electrical power to the motor 170.

The motor 170 is disposed along a longitudinal axis $A_L$ of the housing 101. The motor 170 includes a stator 171 and rotor 181 disposed about the longitudinal axis $A_L$. The rotor 181 is disposed within a central cavity defined by the stator 171 and is configured to be coupled to a shaft 150 of the filter element 130, as described in further detail herein. At least a portion of the stator 171 is disposed within the cover 106. The stator 171 is supported by and coupled to a stator plate 180 that is disposed within the internal volume defined by the housing main body 102 and is located between the filter element 130 and the stator 171.

As shown in FIG. 2, the stator plate 180 defines a stator plate inner flange 189 extending axially from an inner rim of the stator plate 180 towards the stator 171 such that a radially outer surface of the stator plate inner flange 189 is disposed adjacent to a radially inner surface of the stator 171. A stator plate inner sealing member 191 (e.g., an O-ring or a gasket) is disposed between the radially outer surface of the stator plate inner flange 189 and the radially inner surface of the stator 171 so as to form a radial seal therewith.

The stator plate inner flange 189 includes a bearing ledge 193 extending radially inwards from an end of the stator plate inner flange 189 such that a groove is formed for receiving a motor bearing 185. The motor bearing 185 may be secured in the groove using a tolerance ring, press-fit, or shrink-fit. In some embodiments, a biasing member 187 (e.g., a wave washer) to provide pre-loading to the end of the shaft 150 that is disposed in the motor bearing 185. Forming the motor 170 static components in two parts with the stator 171 and the stator plate 180 allows the rotor 181 to be installed after the motor bearing 185 is fit into the stator plate inner flange 189. The motor bearing 185 may be lubricated (e.g., greased) for life. The motor bearing 185 fit provides a sufficient air gap between the stator 171 and a magnet laminate stack of the rotor 181. In some embodiments, the stator 171 may be overmolded and sealed with stator plate 180 either directly or with a separate sleeve to prevent ingress of blowby gases into the stator 171 or a controller compartment 186 of the stator 171.

A radially outer rim of the stator plate 180 is disposed against a radially inner surface of the housing main body 102. A stator plate outer sealing member 183 (e.g., an O-ring or gasket) is between the outer rim of the stator plate 180 and the inner surface of the housing main body 102 so as to form a radial seal between the stator plate 180 and the housing main body 102. A motor controller 174 may be disposed in the controller compartment 186 formed between the cover 106 and the cover plate 172.

Referring to FIGS. 4-11, the filter element 130 is disposed within the housing main body 102 between the base 104 and the motor 170. The filter element 130 comprises a filter media 132, an end cap assembly 140, a shaft 150, and a hub 160. The shaft 150 is disposed about the longitudinal axis $A_L$ of the filter assembly 100. The shaft 150 may be formed from metals (e.g., stainless steel, cast iron, aluminum, etc.) or any other suitable material. The shaft 150 includes a first end 151 configured to be coupled to the rotor 181 of the motor 170, for example, using a securing member (e.g., screws, nuts, bolts, rivets, etc.) or press-fit thereto, such that the shaft 150 is configured to rotate in response to rotation of the rotor 181. A second end 153 of the shaft 150 opposite the first end 151 is configured to slide into the housing bearing 115 with a sliding fit to accommodate thermal expansion. The biasing member (e.g., a wave washer or spring) that may be disposed around the housing bearing 115 may preload the second end 153 of the shaft 150.

The shaft 150 includes a shaft main body 152. A first bearing mount surface 154 extends axially from the shaft main body 152. The first bearing mount surface 154 is defined proximate to the first end 151 of the shaft 150 and is configured to be mounted within the motor bearing 185. A second bearing mount surface 156 extends axially from the shaft main body 152 and is defined proximate to the second end 153 of the shaft 150 and is configured to be positioned within the housing bearing 115. A second bearing mount surface 156 may have a smaller diameter than the shaft main body 152 such that only the second end 153 of the shaft 150 is insertable into the housing bearing 115 up to the second bearing mount surface 156, and the larger diameter shaft main body 152 cannot be inserted into the housing bearing 115. In some embodiments, a length of the shaft 150 beyond the second bearing mount surface 156 is shorter than a length of the shaft 150 beyond the first bearing mount surface 154.

A hub 160 is disposed circumferentially around the shaft 150 and coupled to the shaft 150 such that the hub 160 is rotationally locked with respect to the shaft 150. In some embodiments, the hub 160 includes a hub inner flange 164 disposed circumferentially around the shaft main body 152 coaxially around the shaft main body 152. A hub outer flange 166 is disposed circumferentially around the hub inner flange 164 and radially outwards of the hub inner flange 164. A hub base 162 extends radially from the hub inner flange 164 to the hub outer flange 166. In some embodiments, the shaft main body 152 defines at least one slot 158 (e.g., an axial slot). In such embodiments, the hub inner flange 164 defines a projection 168 that is disposed in the slot 158. In some embodiments, the hub is overmolded around the shaft main body 152.

Figures 8A, 8B:
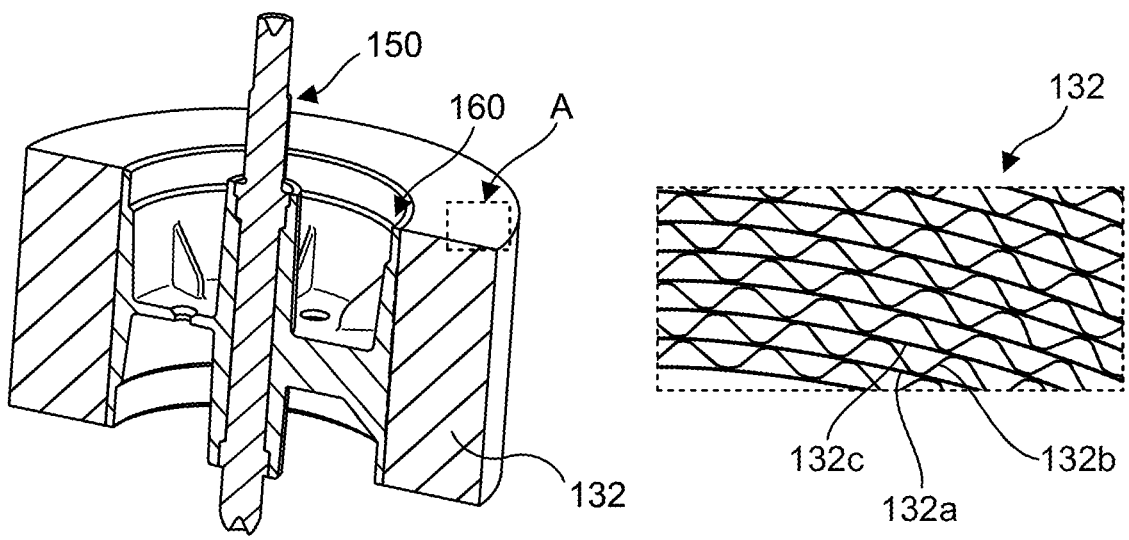
FIG. 8A is a side cross-section view of the portion of the filter element of FIG. 7 taken along the line C-C in FIG. 7.
FIG. 8B is an enlarged view of a portion indicated by the arrow A in FIG. 8A of the filter media included in the filter element of FIG. 8A.

The filter element 130 also comprises a filter media 132 disposed around the hub 160 and secured to the hub 160. In some embodiments, the filter media 132 comprises a wound filter media 132 including a corrugated media layer interposed between two flat facing media layers such that axial flow channels are defined between the facing media layers and the corrugated media layer. Referring to FIG. 8B, the filter media 132 may include a first facing media layer 132a, a second facing media layer 132c, and a corrugated media layer 132b interposed between the first facing media layer 132a and the second facing media layer 132c such that adjacent peaks of the corrugated media layer 132b contact either the first facing media layer 132a or the second facing media layer 132c. In this manner, a plurality of axial flow channels are formed between the facing media layers 132a/c and the corrugated media layer 132c. It should be understood that, when the filter media is in a "wound" configuration, the first facing media layer 132a and the second facing media layer 132b may be part of the same continuous sheet of material.

Figure 3:
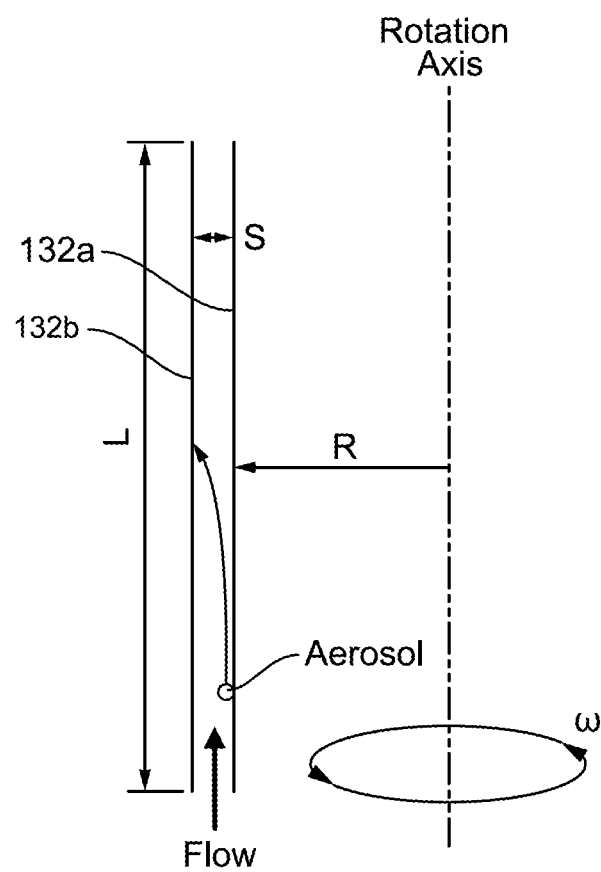
FIG. 3 is a schematic illustration of a portion of a filter media that may be used in the filter assembly of FIGS. 1-2 showing the mechanism of coalescence of aerosols and/or oil due to rotation of the filter media.
Figure 6:
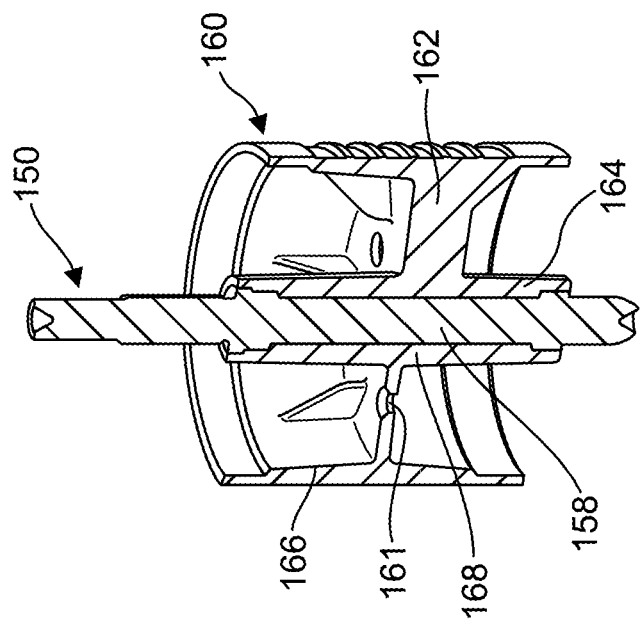
FIG. 6 is a side cross-section view of the hub and shaft of FIG. 5 taken along the line B-B in FIG. 5.
Figure 5:
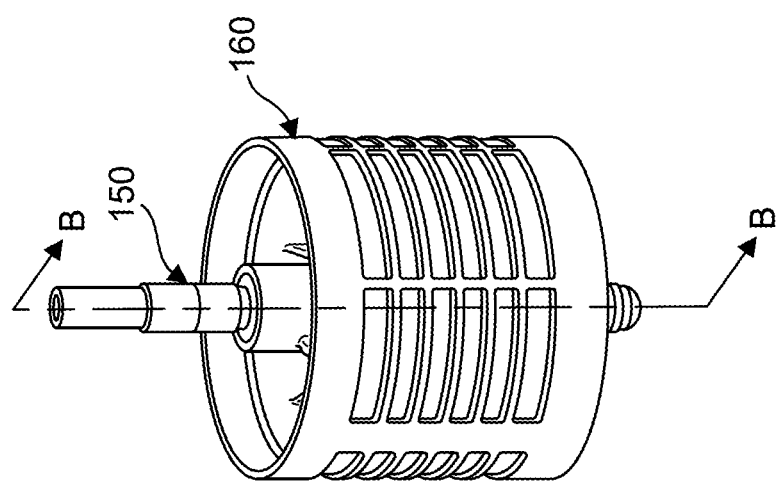
FIG. 5 is a side perspective view of the hub included in the filter element of the filter assembly of FIG. 2 disposed around the shaft of FIG. 4.
Figure 4:
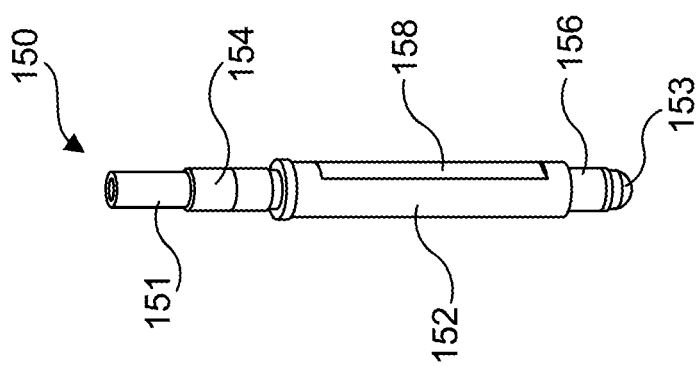
FIG. 4 is a side perspective view of a shaft included in a filter element of the filter assembly of FIGS. 1-2.
Figure 7:
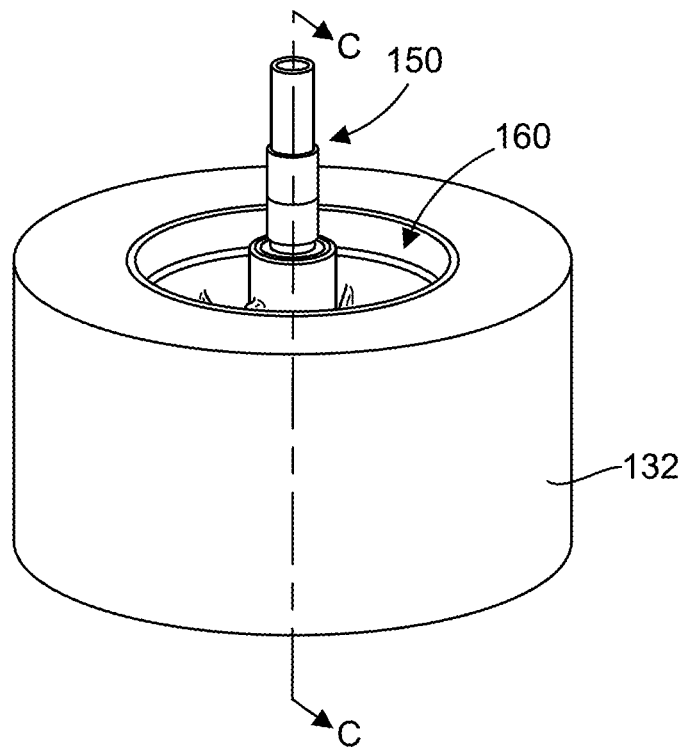
FIG. 7 is a side perspective view of a portion of the filter element of the filter assembly of FIG. 2 showing a filter media disposed around the hub of FIG. 5-6.

FIG. 3 shows a pair of filter media layers 132a/b of the filter media 132 having a length L that are spaced apart from each other by a setting distance S. The (first) radially inner filter media layer 132a of the pair of filter media layers 132a/b is located at a radial distance R from a rotational axis of the filter media 132, which is defined by the longitudinal axis $A_L$. Blowby gases enter axially between the pair of filter media layers 132a/b. Rotation of the shaft 150 at a rotational velocity w causes the rotationally locked hub 160 and the filter media 132 to rotate with the shaft 150. The aerosol or oil experience G forces and get separated from blowby flow. Separated aerosol and liquid coalesce in the axial flow channel between the pair of filter media layers 132a/b and forms a film of oil which travels up towards the outlet of the channel as shown in FIG. 3. The film then gets shed towards an inner wall of a second (top) end cap 144 (depicted in FIGS. 9-11). The oil then drains into a gap between the inner wall of the second end cap 144 and the filter media 132. Oil drains towards the openings at the bottom of the filter element 130 at the outer diameter of the filter media 132 due to G forces created by the conical shape of the second end cap 144. The separated oil gets drained from the filter element 130 into a collection chamber defined in the base 104, for example, via drain openings created between a second end cap sidewall 146 of the second end cap 144 and a first end cap 142. The collected oil aerosol or oils can then be drained back to the engine.

The filter media 132 and the hub 160 are disposed inside an end cap assembly 140. Various embodiments of the end cap assembly 140 are described in detail in PCT Application No. PCT/US2019/033238, entitled "Anti-Rotation Features for Crankcase Ventilation Filters" and the entire disclosure of which is incorporated herein by reference.

Figure 9:
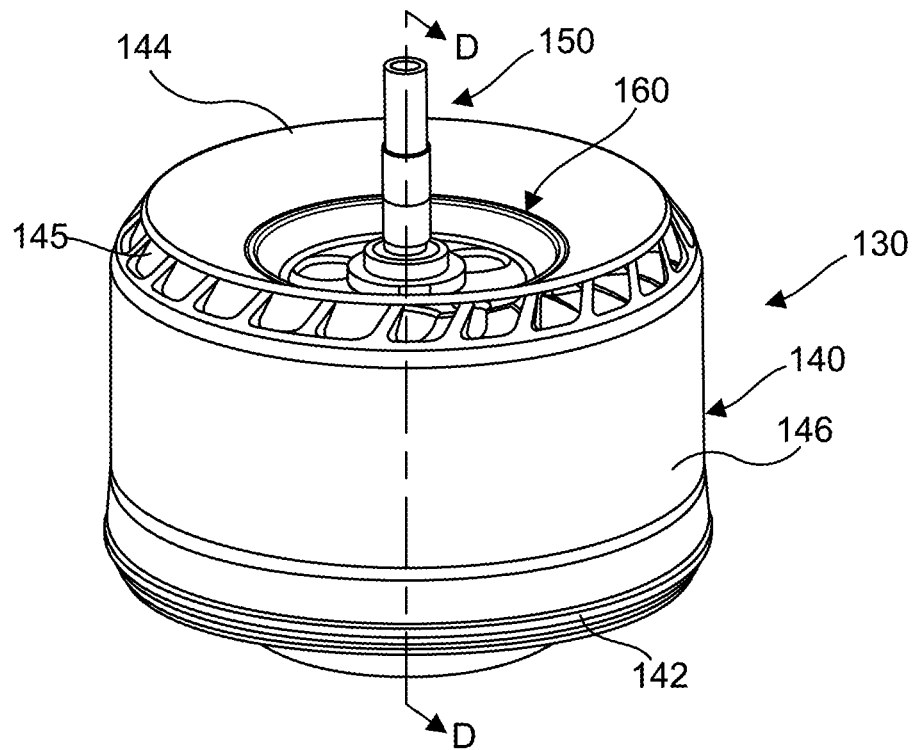
FIG. 9 is a side perspective view of the filter element included in the filter assembly of FIG. 2.
Figure 10:
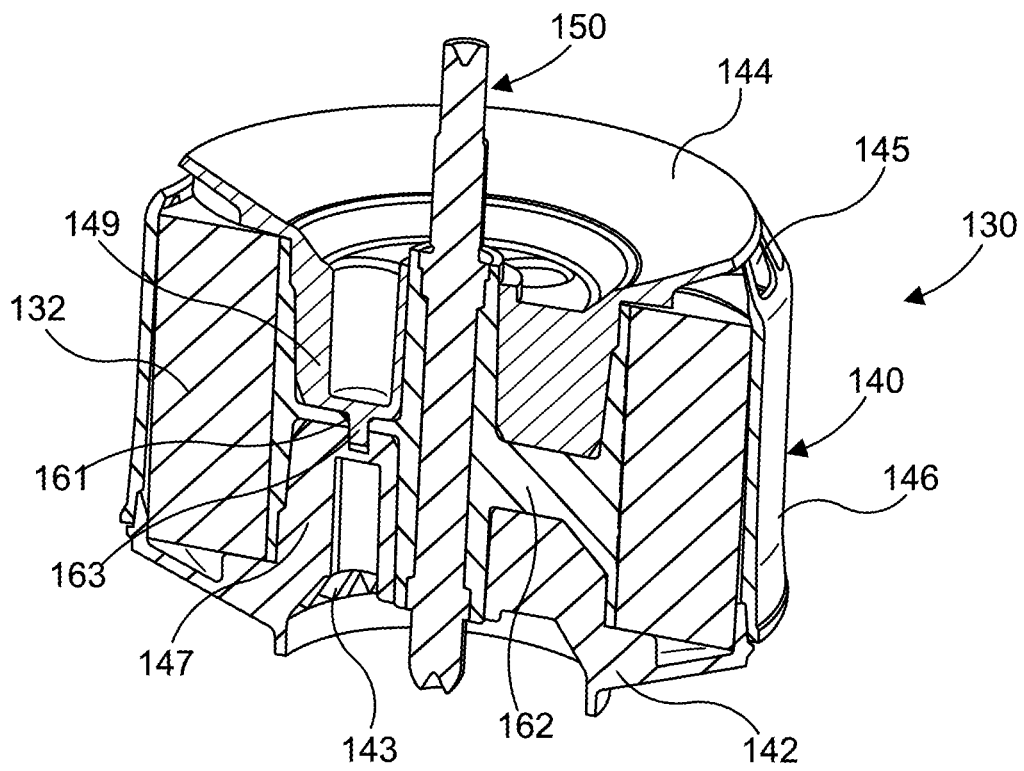
FIG. 10 is a side cross-section view of the filter element of FIG. 9 taken along the line D-D in FIG. 9.
Figure 11:
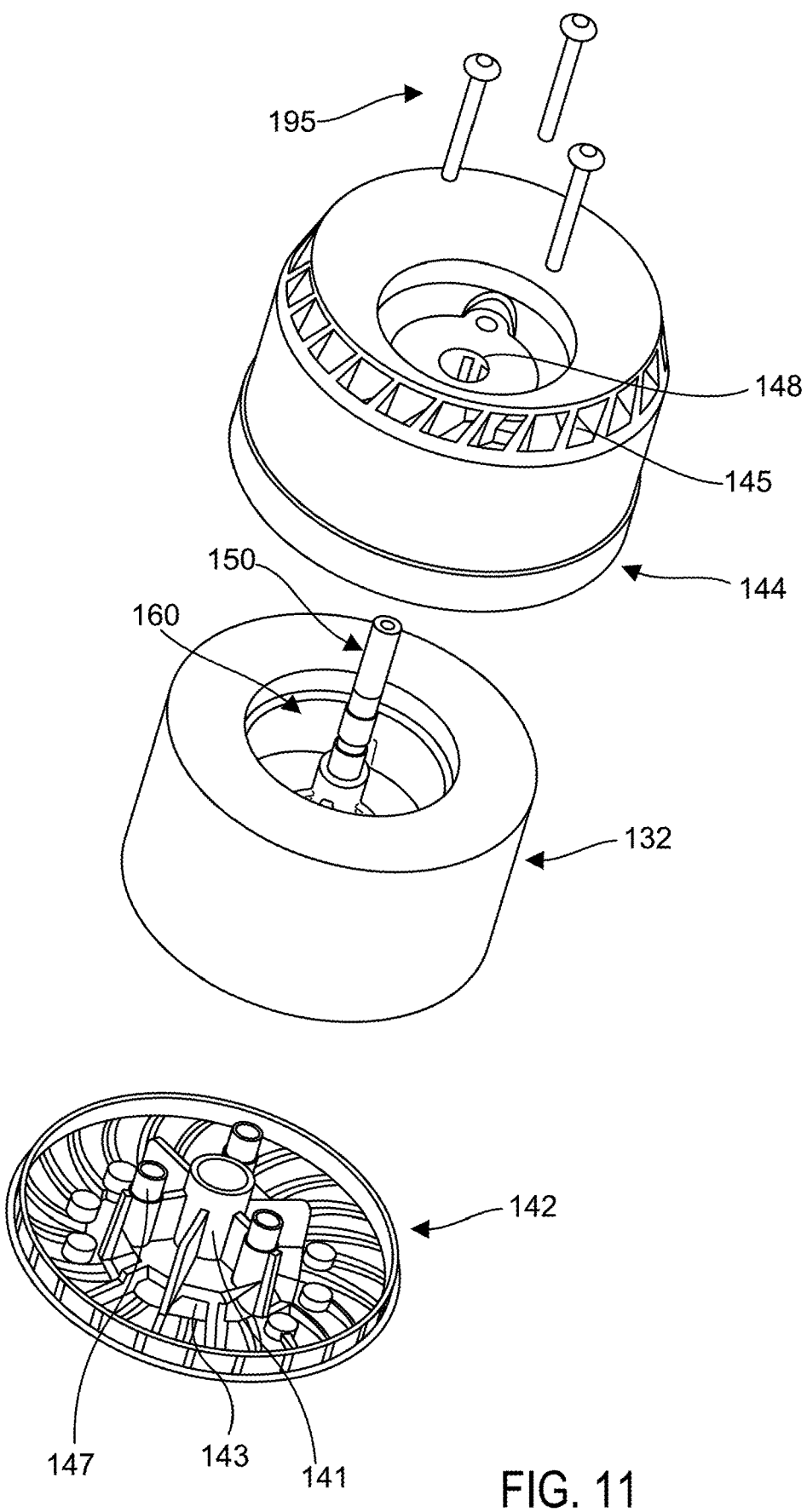
FIG. 11 is an exploded view of the filter element of FIG. 9.

Referring to FIGS. 9-11, in some embodiments, the end cap assembly 140 comprises the first end cap 142 disposed on a filter media first end that is proximate to the base 104. The second end cap 144 is disposed on a filter media second end that is opposite the filter media first end. The second end cap 144 includes the second end cap sidewall 146 extending axially from a radially outer rim of second end cap 144 towards the first end cap 142 and is coupled to a radially outer rim of the first end cap 142 (e.g., welded or bonded via an adhesive). The filter media 132 and the hub 160 is secured between the first end cap 142 and the second end cap 144, and are disposed within the end cap assembly 140. A plurality of first end cap apertures 143 are defined in the first end cap 142 and configured to allow blowby gases to enter the end cap assembly 140 and flow axially through the filter media 132. A plurality of second end cap openings 145 are defined in the second end cap 144 and are configured to allow filtered blowby gases to exit the filter element 130 therethrough.

In some embodiments, the hub base 162 defines a plurality of openings 161 therethrough. The first end cap 142 includes a plurality of first pillars 147 extending from a base of the first end cap 142 towards the second end cap 144. The second end cap 144 also includes a plurality of second pillars 149 extending from a base of the second end cap 144 towards the first end cap 142. Each of the plurality of first pillars 147 are coupled to a corresponding second pillar 149 of the plurality of second pillars 149 through the openings 161. For example, a protrusion 163 may extend from a tip of each of the plurality of second pillars 149 through corresponding openings 161 and inserted into an aperture defined in a corresponding first pillar 147 of the plurality of first pillars 147. In some embodiments, the plurality of first pillars 147 and the plurality of second pillars 149 may be hollow. Securing members 195 (e.g., screws, bolts, etc.) may be inserted through the plurality of second pillars 149 into corresponding first pillar 147 of the plurality of first pillars 147 and coupled thereto to secure the first end cap 142 to the second end cap 144.

A first central pillar 141 defining a first central channel extends axially from the first end cap 142 towards the second end cap 144 and is disposed around a portion of the hub inner flange 164 located below the hub base 162. Moreover, a second central pillar 148 defining a second central channel extends axially from the second end cap 144 towards the first end cap 142 and is disposed around a portion of the hub inner flange 164 located above the hub base 162. In this manner, the hub 160 is snugly fit between the first end cap 142 and the second end cap 144.

To assemble the filter assembly 100, the first end 151 of the shaft 150 of the filter element 130 is coupled to the rotor 181 (e.g., shrink-fit or press-fit thereto) such that the filter element 130 and the motor 170 to form a sub-assembly. The housing bearing 115 may be press-fit or shrink-fit to the second bearing mount surface 156. The housing bearing 115 may be in a sliding fit with the bearing mount flange 114. In this manner, the filter element 130 is aligned with the inlet 103 creating a flow path for blowby gases to enter into the filter element 130 and flow axially through the filter media 132.

Figure 12:
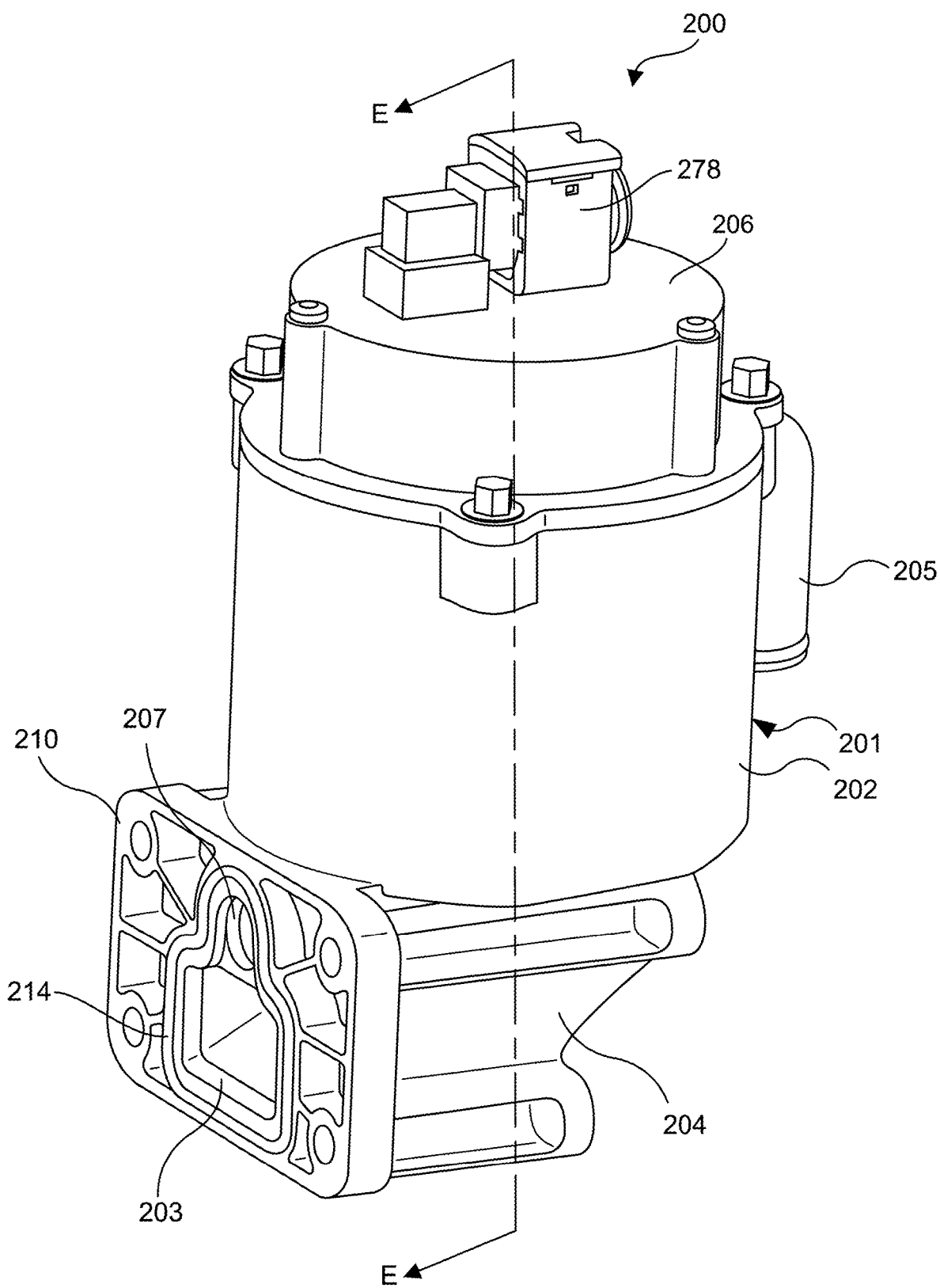
FIG. 12 is a top side perspective view of a rotating crankcase ventilation filter assembly, according to another embodiment.
Figure 13:
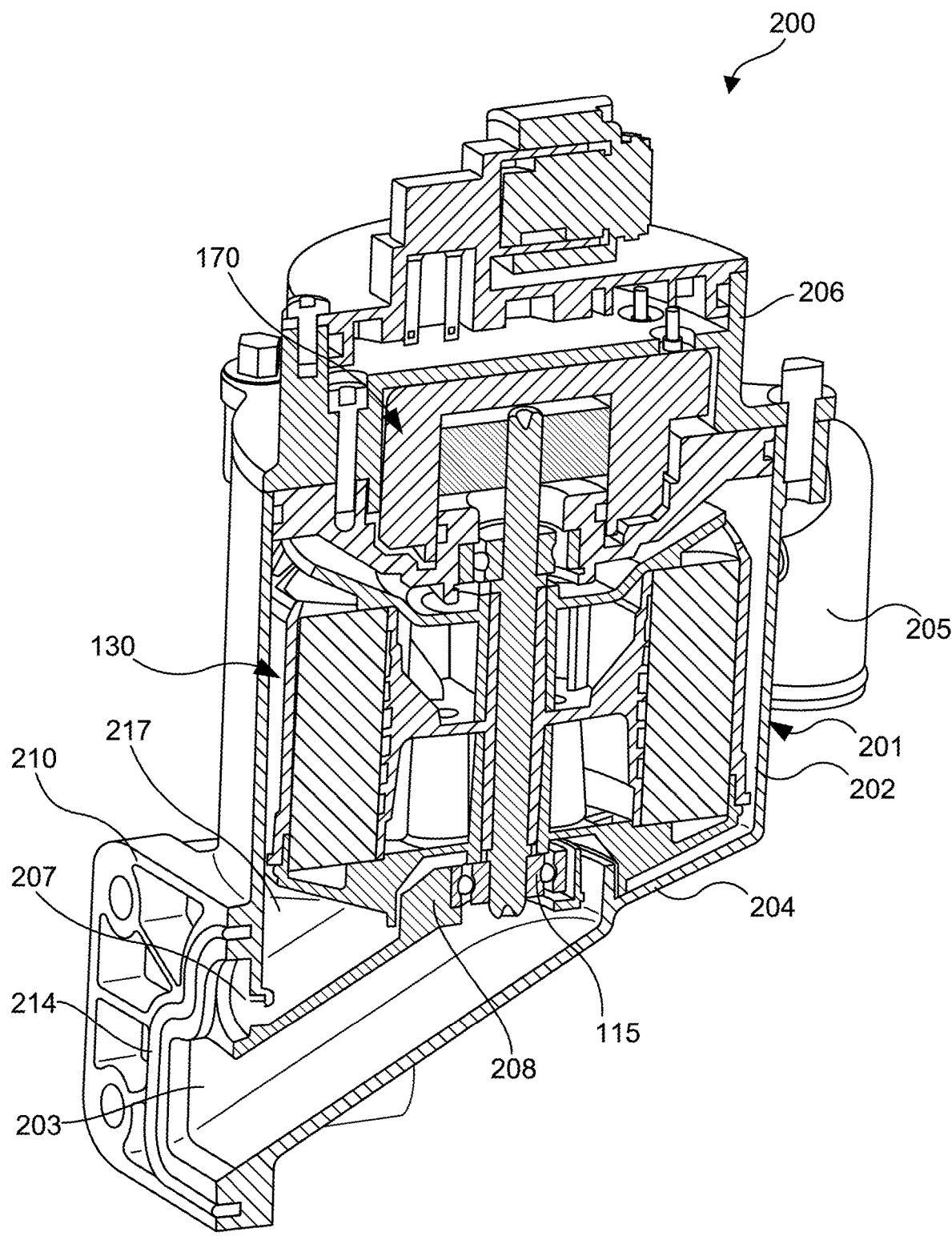
FIG. 13 is a side cross-section view of the filter assembly of FIG. 12 taken along the line E-E in FIG. 12.

FIGS. 12 and 13 show a rotating crankcase ventilation filter assembly 200, according to another embodiment. The filter assembly 200 includes a housing 201 within which the filter element 130 and the motor 170 is disposed. The housing 201 includes a housing main body 202 and a base 204. The housing 201 is similar to the housing 101 with the following differences. The housing 201 includes a mounting flange 210 extending from the base 204 and is configured to be coupled to a support structure, for example, to an engine crankcase sump (not shown). An outlet 205 is defined through a wall of the housing main body 202.

Different from the housing 101, the housing 201 includes an inlet 203 integrally defined through the mounting flange 210. An inlet flange 208 extends axially from an end of the inlet 203 that is located proximate to the base 204 into the internal volume defined by the housing main body 202. The housing bearing 115 is mounted within the inlet flange 208 such that a separate bearing mounting plate is not used. A drain 207 is also defined in the mounting flange 210 above the inlet 203 and configured to drain aerosols or oils collected in a collection chamber 217 defined in the base 204 around the inlet flange 208. Moreover, a flange sealing member 214 is disposed in a groove defined in a sealing surface of the mounting flange 210 and configured to form a seal at an interface of the mounting flange 210 and the support structure around the inlet 203 and the drain 207.

Figure 14:
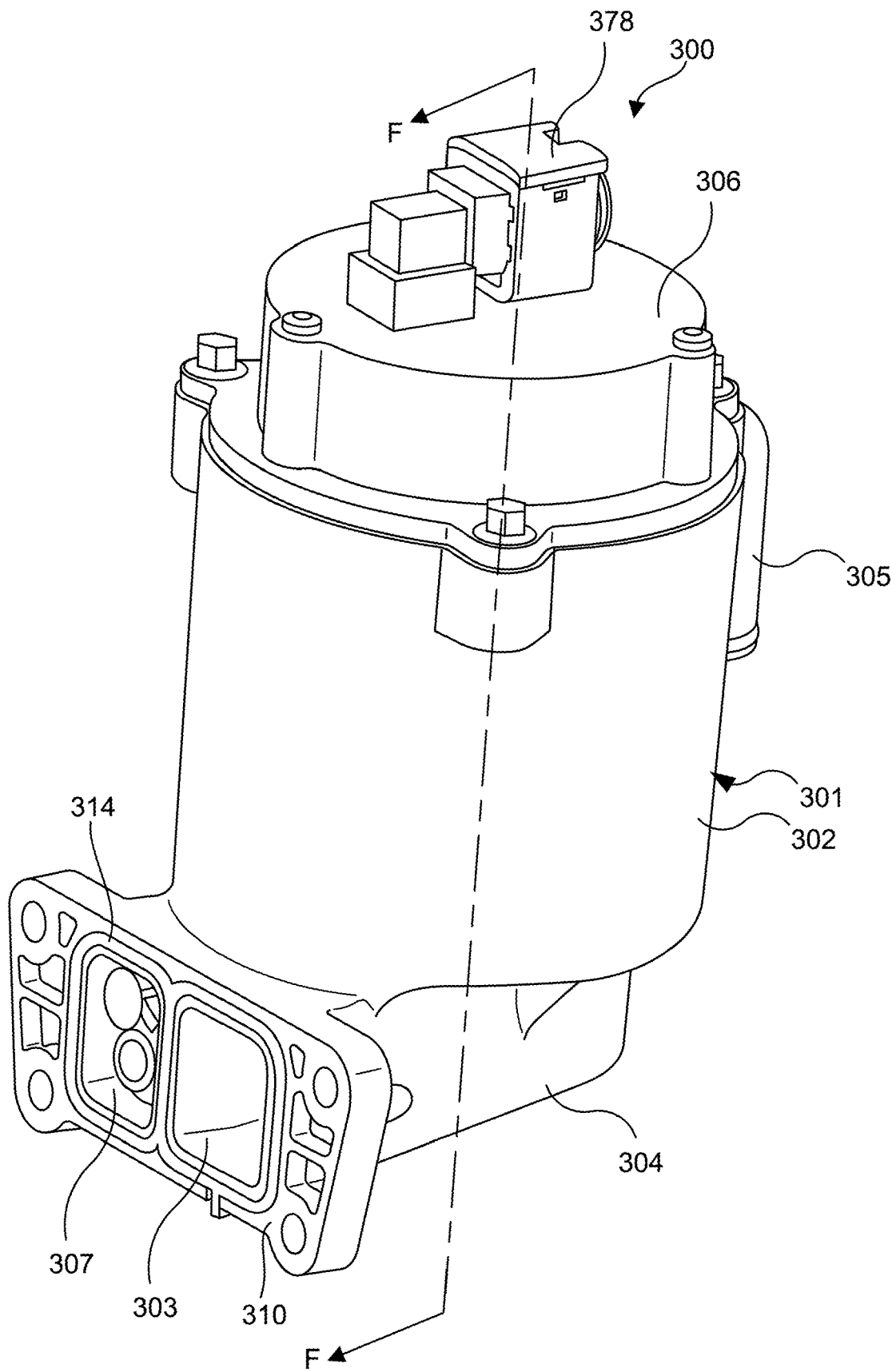
FIG. 14 is a top perspective view of a rotating crankcase ventilation filter assembly, according to yet another embodiment.
Figure 15:
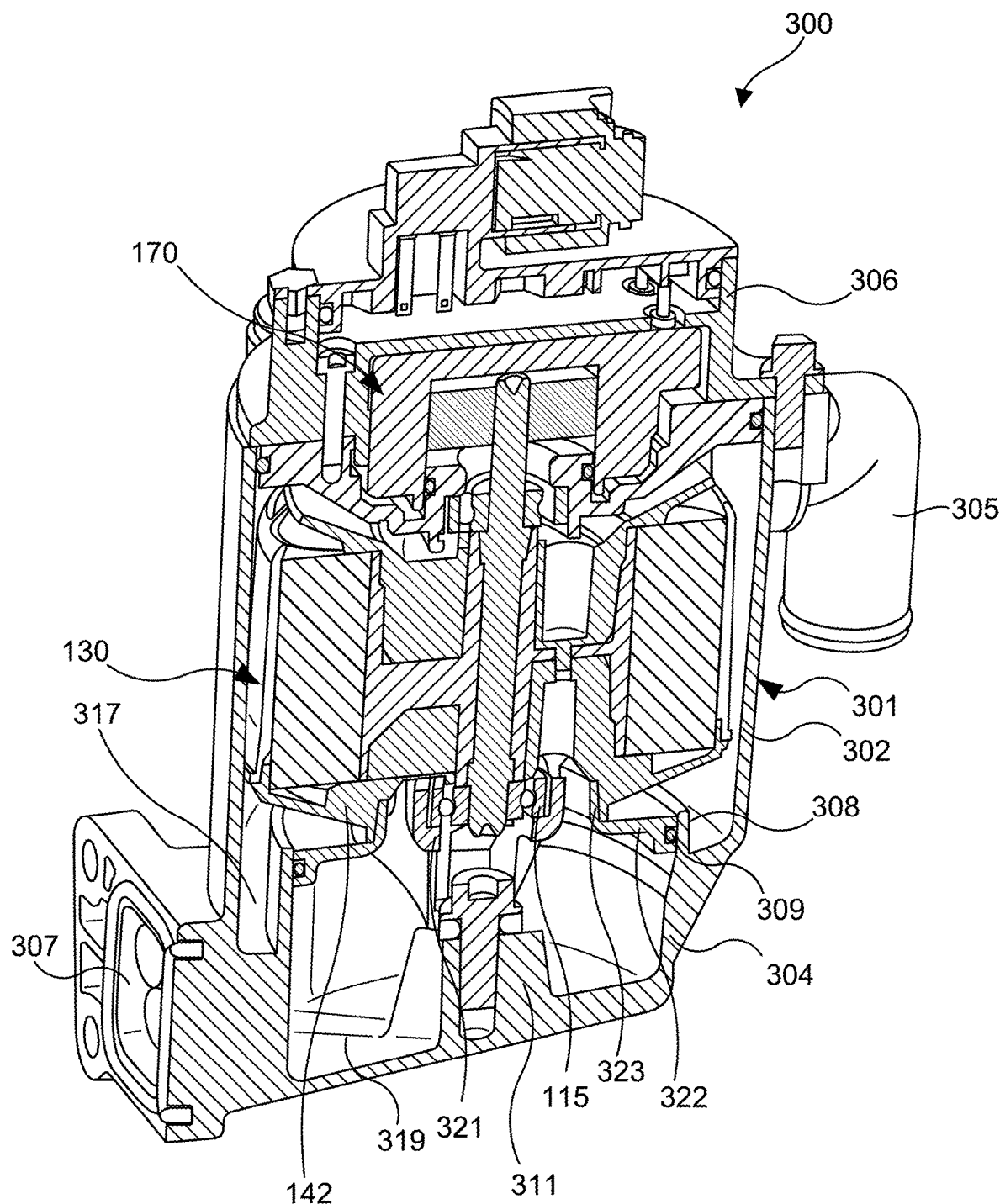
FIG. 15 is a side cross-section view of the filter assembly of FIG. 14 taken along the line F-F in FIG. 14.

FIGS. 14 and 15 shows a rotating crankcase ventilation filter assembly 300, according to still another embodiment. The filter assembly 300 includes a housing 301 within which the filter element 130 and the motor 170 is disposed. The housing 301 includes a housing main body 302 and a base 304. A mounting flange 310 extends from the base 304 and is configured to be coupled to a support structure. The mounting flange 310 defines a drain 307 configured to drain aerosols or oils collected in a collection chamber 317 defined in the base 304. A mounting flange 310 also defines an inlet 303 that is fluidly coupled to an inlet chamber 319 defined in the base 304. An outlet 305 is defined on a wall of the housing main body 302.

The collection chamber 317 defines an axial wall 308 extending axially from an inner rim of the collection chamber 317 into the housing main body 302. The collection chamber 317 is fluidly isolated from the inlet chamber 319 and located radially outwards of the inlet chamber 319. A mounting plate 322 is positioned radially inward of the axial wall 308 and is coupled to a radially inner surface of the axial wall 308, for example, via securing members, a friction fit, or a snap fit. An axial wall sealing member 309 is disposed between a radially outer rim of the axial wall 308 and the radially inner surface of the axial wall 308. The mounting plate 322 also includes a sealing flange 323 extending from an inner rim of the mounting plate 322 into the housing main body 302 and coupled to the first end cap 142 of the filter element 130 so as to prevent the incoming blowby gases to leak into the collection chamber 317 and bypass the filter element 130.

A bearing mounting plate 321 is mounted on an axial end of a mounting pillar 311 extending from a base of the inlet chamber 319 towards the mounting plate 322. The bearing mounting plate 321 is configured to house the housing bearing 115. A bearing mounting plate 321 is positioned within the inner rim of the mounting plate 322 such that a gap is defined between the sealing flange 323 and the bearing mounting plate 321, which allows incoming blowby gases to flow through the gap into the filter element 130.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A rotating crankcase ventilation filter element, comprising:
   a motor comprising a stator and a rotor;
   a shaft, a first end of the shaft configured to be coupled to the rotor and configured to rotate in response to rotation of the rotor;
   a hub disposed circumferentially around the shaft, the hub comprising a hub inner flange coupled to and in contact with the shaft such that the hub is rotationally locked with respect to the shaft;
   a filter media disposed around the hub and secured to the hub such that the filter media is rotationally locked with respect to the hub, the filter media structured for axial flow of a gas through the filter media;
   a first end cap disposed on a filter media first end; and
   a second end cap disposed on a filter media second end of the filter media opposite the filter media first end, the second end cap coupled to the first end cap such that the filter media and the hub is secured between the first end cap and the second end cap.

2. The rotating crankcase ventilation filter element of claim 1, wherein the shaft comprises:
   a shaft main body;
   a first bearing mount surface extending axially from the shaft main body, the first bearing mount surface defined proximate to the first end of the shaft, which is coupled to the rotor; and
   a second bearing mount surface extending axially from the shaft main body and defined proximate to a second end of the shaft, which is opposite the first end of the shaft.

3. The rotating crankcase ventilation filter element of claim 2, wherein the hub comprises:
   the hub inner flange disposed circumferentially around the shaft main body coaxially around the shaft main body;
   a hub outer flange disposed circumferentially around the hub inner flange and radially outwards of the hub inner flange, the filter media disposed around the hub outer flange; and
   a hub base extending radially from the hub inner flange to the hub outer flange.

4. The rotating crankcase ventilation filter element of claim 3, wherein the shaft main body defines at least one groove, and wherein the hub inner flange defines a projection that is disposed in the groove.

5. The rotating crankcase ventilation filter element of claim 3, wherein the hub is overmolded around the shaft.

6. The rotating crankcase ventilation filter element of claim 3, wherein:
   the hub base defines a plurality of openings therethrough;
   the first end cap comprises a plurality of first pillars extending from a base of the first end cap towards the first end cap; and
   the second end cap comprises a plurality of second pillars extending from a base of the second cap towards the first end cap, each of the plurality of first pillars coupled to a corresponding second pillar of the plurality of second pillars through the openings.

7. The rotating crankcase ventilation filter element of claim 1, wherein the filter media comprises a wound filter media.

8. The rotating crankcase ventilation filter element of claim 7, wherein the filter media comprises:
   a first facing media layer;
   a second facing media layer; and
   a corrugated media layer interposed between the first facing media layer and the second facing media layer such that axial flow channels are defined between: (a)

the first facing media layer and the corrugated media layer, and (b) the second facing media layer and the corrugated media layer.

9. A rotating crankcase ventilation filter assembly, comprising:
a housing comprising:
a housing main body, and
a base coupled to a first end of the housing main body,
a rotating crankcase ventilation filter element disposed at least partially within the housing, the rotating crankcase ventilation filter element comprising:
a motor comprising a stator and a rotor;
a shaft, a first end of the shaft coupled to the rotor and configured to rotate in response to rotation of the rotor,
a hub disposed circumferentially around the shaft, the hub comprising a hub inner flange coupled to and in contact with the shaft such that the hub is rotationally locked with respect to the shaft;
a filter media disposed around the hub and secured to the hub such that the filter media is rotationally locked with respect to the hub, the filter media structured for axial flow of a gas through the filter media;
a first end cap disposed on a filter media first end; and
a second end cap disposed on a filter media second end of the filter media, the second end cap coupled to the first end cap such that the filter media and the hub is secured between the first end cap and the second end cap.

10. The rotating crankcase ventilation filter assembly of claim 9, wherein the housing further comprises:
a bearing mount flange extending axially from an inner rim of the base into an internal volume defined by the housing main body; and
a housing bearing disposed within the bearing mount flange,
wherein a second end of the shaft opposite the first end is disposed within the housing bearing via a sliding fit.

11. The rotating crankcase ventilation filter assembly of claim 9, wherein the housing further comprises:
a mounting flange extending from the base of the housing; and
a drain defined through the mounting flange.

12. The rotating crankcase ventilation filter assembly of claim 11, wherein the housing further comprises an inlet flange extending axially from an inner rim of the base away from an internal volume defined by the housing main body, an inlet mounting end of an inlet being receivable within the inlet flange for coupling the inlet to the housing.

13. The rotating crankcase ventilation filter assembly of claim 11, wherein the housing further comprises:

an inlet defined through the mounting flange; and
an inlet flange extending axially from an end of the inlet that is located proximate to the base into an internal volume defined by the housing main body,
wherein the drain is located axially above the inlet.

14. The rotating crankcase ventilation filter assembly of claim 13, further comprising a housing bearing disposed within the inlet flange,
wherein a second end of the shaft opposite the first end is disposed within the housing bearing via a sliding fit.

15. The rotating crankcase ventilation filter assembly of claim 11, wherein the housing further comprises:
an inlet defined through the mounting flange;
an inlet chamber defined in the base, the inlet being fluidly coupled to the inlet chamber; and
a collection chamber defined in the base, the collection chamber being fluidly isolated from the inlet chamber.

16. The rotating crankcase ventilation filter assembly of claim 15, wherein the collection chamber is located radially outwards of the inlet chamber.

17. The rotating crankcase ventilation filter assembly of claim 15, wherein:
the collection chamber comprises an axial wall extending axially from an inner rim of the collection chamber into the housing main body, and
the housing further comprises a mounting plate positioned radially inward of the axial wall and coupled to a radially inner surface of the axial wall.

18. The rotating crankcase ventilation filter assembly of claim 17, wherein the mounting plate comprises a sealing flange extending from an inner rim of the mounting plate into the housing main body, the sealing flange being coupled to the mounting flange.

19. The rotating crankcase ventilation filter assembly of claim 17, wherein the housing further comprises:
a mounting pillar extending from a base of the inlet chamber towards the mounting plate; and
a bearing mounting plate mounted on an axial end of the mounting pillar within the inner rim of the mounting plate.

20. The rotating crankcase ventilation filter assembly of claim 19, wherein a gap is defined between the sealing flange and an outer periphery of the bearing mounting plate so as to allow incoming blowby gases to flow through the gap into the filter element.

21. The rotating crankcase ventilation filter element as claimed in claim 1, wherein the hub is overmolded around the shaft.

22. The rotating crankcase ventilation filter element as claimed in claim 1, wherein the hub is coupled directly to the shaft without any intervening components.

* * * * *